(No Model.)
C. P. STEINMETZ.
MONOCYCLIC MOTOR.
No. 533,250. Patented Jan. 29, 1895.
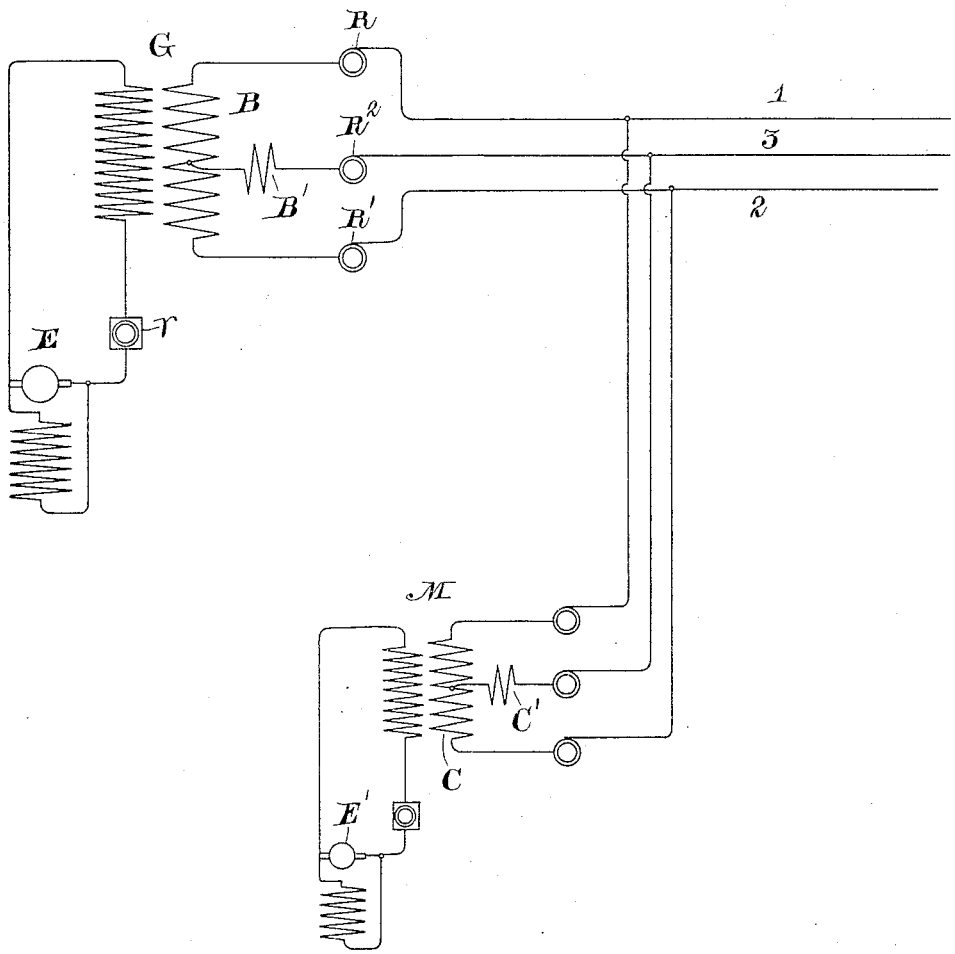
WITNESSES
A. F. Macdonald
B. B. Hull
INVENTOR
Charles P. Steinmetz
By his Atty

UNITED STATES PATENT OFFICE.

CHARLES P. STEINMETZ, OF SCHENECTADY, NEW YORK, ASSIGNOR TO THE THOMSON-HOUSTON ELECTRIC COMPANY, OF BOSTON, MASSACHUSETTS.

MONOCYCLIC MOTOR.

SPECIFICATION forming part of Letters Patent No. 533,250, dated January 29, 1895.

Application filed November 24, 1894. Serial No. 529,806. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Monocyclic Motors, of which the following is a specification.

The present invention relates to an improved electric motor, designed to operate in substantially the same manner as a single-phase synchronous alternating motor, but possessing certain novel features.

In the drawing illustrating the invention there is shown in diagram an alternating generator G of the type described in other applications for patents, and commonly known as a monocyclic generator. It resembles ordinary single-phase alternators, except that it is provided with an additional generating coil for maintaining an out-of-phase electromotive force on a third main connected with the coil.

In the drawing E represents a shunt-wound exciter delivering current to the field winding of the generator and regulated by a rheostat $r$.

B is the main inducing winding of the alternator, whose terminals are connected by brushes and rings R R' with the mains 1, 2, of a distribution system.

The teaser winding of the generator G is connected at one end to the main winding, as indicated, and at its other end to a main 3 through the collector ring and brush $R^2$.

The motor is shown at M and is provided with a field winding in the circuit of an exciter E' and main and teaser armature windings C C' interconnected in the same manner as in the generator. The three free terminals of the main and teaser windings are in circuit with branches leading from the mains 1, 2, 3. Ordinarily, transformers would be used to reduce the potential of the currents supplied to the motor, but this is a feature well understood in the art, and is not illustrated, since it is not a material part of the invention.

I prefer that the generator and motor be so proportioned that when the motor is in normal operation, alternating currents will flow through the main winding C supplying the necessary power for operating the motor, while the teaser coil C' simply generates a counter electromotive force balancing the impressed electromotive force at the terminal of the coil, so that substantially no current flows in the coil under these conditions. This condition of balance may be secured by properly adjusting or proportioning the teaser windings of the generator and motor, or the impedance of the connecting main or other like factors well known to electricians.

In the drawing, the main and teaser windings of the generator are shown proportioned as four to one, while in the motor the corresponding windings bear the proportion of seven to two. Hence, the counter electromotive force developed in the main winding of the motor will be insufficient to prevent the flow of energy currents through it, while the impressed and counter electromotive forces in the teaser coils and main 3 will be substantially balanced. When, however, the motor is starting, the counter electromotive force is less than normal in the teaser coil, so that currents will flow through the coil and give the motor a self-starting capacity. The chief function of the teaser coil is to enable the motor to start, though in many cases it is useful to preserve the balance between a number of machines when running under varying conditions of load. When the machine is once started it runs as a single-phase synchronous motor. In starting up a motor of this character, the field of the machine should be left unexcited until the armature has been brought to speed, as is now the common practice with different forms of polyphase motors.

By the terms "main" and "teaser" coils, as herein used, I refer to coils arranged and proportioned to have the functions already described; that is, the main coil resembles, and has the function, of the corresponding coil in machines of the single-phase type. It carries substantially all the power current operating the motor under normal running conditions. The primary object of the teaser coil is not to receive power current, but to generate an out-of-phase counter electromotive force normally maintaining a balance between the electro-motive forces on the balance wire to which it is connected.

What I claim as new, and desire to secure by Letters Patent of the United States, is—

1. An alternating current motor provided with main and teaser coils, interlinked as described, and a field winding energized from a source of direct current, as herein set forth.

2. In an electrical distribution system, the combination of mains carrying alternating currents, and a third main upon which an out-of-phase electromotive force is maintained, in combination with an electric motor having interconnected main and teaser windings in circuit with the different mains, and proportioned so that when in normal operation currents for operating the motor flow only through the main winding and a source of direct current energizing the field winding of the motor, as set forth.

In witness whereof I have hereunto set my hand this 21st day of November, 1894.

CHARLES P. STEINMETZ.

Witnesses:
B. B. HULL,
A. F. MACDONALD.